Patented Oct. 14, 1924.

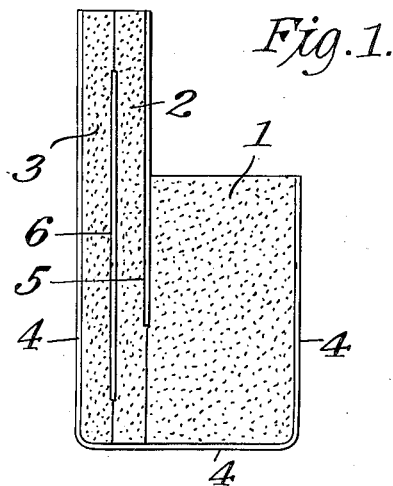
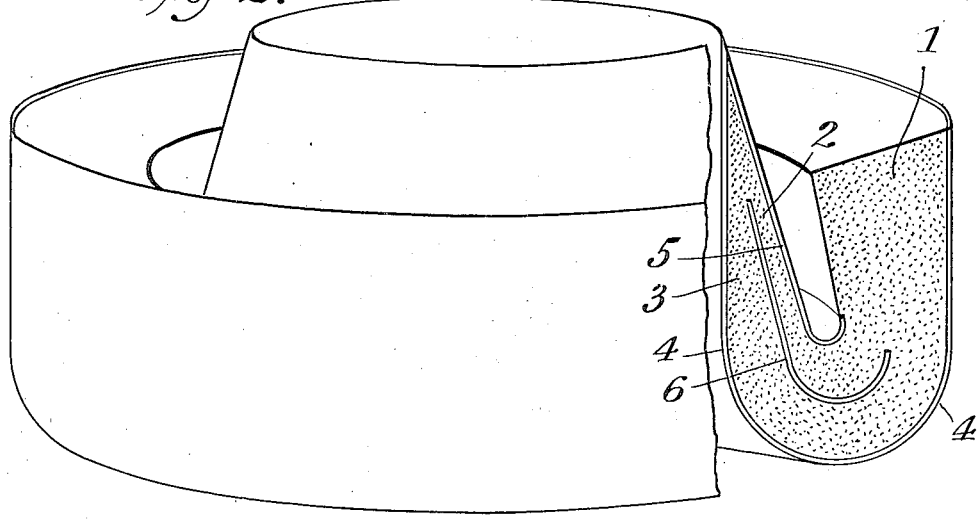

1,511,397

UNITED STATES PATENT OFFICE.

GEORGE CHRISTENSON, OF NORTH PLAINFIELD, NEW JERSEY, ASSIGNOR TO JOHNS-MANVILLE, INCORPORATED, A CORPORATION OF NEW YORK.

PACKING FOR PISTON RODS.

Application filed April 4, 1922. Serial No. 549,629.

*To all whom it may concern:*

Be it known that I, GEORGE CHRISTENSON, a citizen of the United States of America, residing at North Plainfield, county of Somerset, and State of New Jersey, have invented certain new and useful Improvements in Packing for Piston Rods, of which the following is a specification.

My invention relates to packing for piston rods which packing is of the general character described in my prior Patent No. 1,363,565, granted December 28th, 1920, which packing rings consist, essentially, of a composition of matter molded into a form having an inner, tapering, somewhat flexible, lip which rests upon the piston rod and an outer, shorter, thicker, heel portion which occupies the outer portion of the stuffing box when the ring is in use. These two portions are connected by a section bent to a curvature of approximately 180 degrees. When rings of this character are used under conditions where they are subjected to very high pressure, I have found that the same sometimes fail by reason of the steam or other fluid under pressure blowing holes through the curved portion of the ring. My present invention overcomes this difficulty.

The best form of my present invention known to me and the blank preferably used in making the same are illustrated in the accompanying sheet of drawing, in which—

Fig. 1 is a cross-section of the blank, and

Fig. 2 is a perspective view of the completed ring with a portion broken away and shown in cross-section.

Throughout the drawings like reference characters indicate like parts.

The blank shown in Fig. 1 is built up of three layers of any suitable solid, homogeneous plastic material, such, for instance, as is described in my prior Patent No. 1,330,979, dated 17th February, 1920, the first layer of which marked 1 is relatively thick, while the other layers 2 and 3 are relatively thinner and wider, as shown in the drawing. The width of the thinner layers 2 and 3 is approximately equal to the axial dimension of the finished ring shown in Fig. 2. Between the layers 1 and 2 I place a layer of fabric 5, such as asbestos cloth treated with rubber cement, or otherwise saturated with a protective material. This layer of fabric 5 need not extend along the entire meeting surfaces of the composition layers 1 and 2, but preferably should cover the exposed surface of the layer 2, all as shown in Fig. 1. I also place a piece of similar textile fabric 6 between the composition layers 2 and 3. This sheet of fabric 6 need not extend along the entire meeting surfaces of the composition layers 2 and 3, but preferably stops short of the outer edges of these layers, as shown in Fig. 1. A third sheet of textile material 4 is preferably placed around the outer surfaces of the blank on three sides thereof, as shown. This blank, shown in Fig. 1, may be made up in long lengths and cut into sections of lengths equal to the circumference of the packing rings to be made. These sections bent into a ring form and placed in ring-shaped molds of proper conformation, are then heated and molded under pressure produced by forcing a die of proper configuration down upon the mass to give the form shown in Fig. 2 in which the three composition layers 1, 2 and 3 are shown molded into an integral mass, which consists of an inner tapering, somewhat flexible lip adapted to bear upon the piston rod and an outer, shorter, thicker, heel portion formed mainly of the layer 1, the heel and lip being separated except at the lower portion of the ring where they are connected by a portion having a curvature of approximately 180 degrees. As the plastic material flows about in the mold, the inner end of the sheet of fabric 5 will be curved around the inner wall of this curved portion of the ring, as shown in Fig. 2, and the corresponding end of the sheet of fabric 6 will be curved around the bend so formed but left entirely embedded in the plastic material. The outer sheet of fabric 4 will, of course, remain upon the exterior of the molded ring surrounding the curved portion of the cross-section thereof, and extending up to the outer edges of the lip and the heel. When the packing ring so formed is put into use the fabric sheet 6 affords efficient support for the body of the solid material located within its curved portion and helps it to resist any tendency of the fluid under pressure bearing upon the inner portion of the curved section blowing holes through the packing ring at that point. This protective action is also reinforced to a certain extent by the other sheets of fabric 4 and 5.

Having described my invention, I claim:

1. A rod packing ring comprising a thick heel-portion and a tapered lip-portion connected together by a portion of approximately 180 degrees curvature, said ring being made of a solid, molded homogeneous mass in which is embedded a sheet of textile fabric extending around the above mentioned curved portion.

2. A rod packing ring comprising a thick heel-portion and a tapered lip-portion connected together by a portion of approximately 180 degrees curvature, said ring being made of a solid, molded homogeneous mass in which is embedded a sheet of textile fabric extending around the above mentioned curved portion, while other layers of flexible fabric are adherent to the inner and outer walls of the said curved portion and extend around the zone of curvature thereof.

GEORGE CHRISTENSON.